(12) United States Patent
Ueki et al.

(10) Patent No.: US 8,325,981 B2
(45) Date of Patent: Dec. 4, 2012

(54) HUMAN TRACKING APPARATUS, HUMAN TRACKING METHOD, AND HUMAN TRACKING PROCESSING PROGRAM

(75) Inventors: Kazuya Ueki, Koto-ku (JP); Yihong Gong, Cupertino, CA (US); Fengjun Lv, Cupertino, CA (US)

(73) Assignee: NEC Soft, Ltd., Tokyo (JP)

( * ) Notice: Subject to any disclaimer, the term of this patent is extended or adjusted under 35 U.S.C. 154(b) by 866 days.

(21) Appl. No.: 12/427,353

(22) Filed: Apr. 21, 2009

(65) Prior Publication Data

US 2010/0266159 A1    Oct. 21, 2010

(51) Int. Cl.
*G06K 9/00* (2006.01)
*H04N 5/225* (2006.01)

(52) U.S. Cl. .................................. 382/103; 348/169

(58) Field of Classification Search .................. 382/103, 382/107, 236, 165, 181; 348/154, 155, 169, 348/170, 171, 172, 94, 208.1, 208.14, 208.16, 348/352; 706/20; 725/19
See application file for complete search history.

(56) References Cited

U.S. PATENT DOCUMENTS

| | | | | |
|---|---|---|---|---|
| 6,192,322 | B1 * | 2/2001 | Rafanelli et al. | 702/150 |
| 6,873,713 | B2 * | 3/2005 | Okazaki et al. | 382/118 |
| 7,352,880 | B2 * | 4/2008 | Kim et al. | 382/103 |
| 2005/0104959 | A1 | 5/2005 | Han et al. | |
| 2009/0220156 | A1 * | 9/2009 | Ito et al. | 382/201 |

FOREIGN PATENT DOCUMENTS

JP            2004-046647 A        2/2004

* cited by examiner

*Primary Examiner* — Abolfazl Tabatabai
(74) *Attorney, Agent, or Firm* — Sughrue Mion, PLLC (57) ABSTRACT

A human tracking apparatus and method capable of highly accurately tracking the movement of persons photographed in moving images includes: an image memory 107 that stores an inputted frame image; a human detecting unit 101 that detects persons photographed in the inputted frame image; a candidate registering unit 106 that registers already detected persons as candidates; a similarity index calculating unit 102 that calculates similarity indices indicating the similarity between the persons detected in the inputted frame image and the registered candidates for two or more types of parameters based on the stored frame images in relation to all combinations of the persons and the candidates; a normalizing unit 103 that normalizes the similarity indices; an integrating unit 104 that integrates the normalized indices for each combination of the detected persons and the candidates; and a tracking unit 105 that identifies a person the same as an arbitrary candidate based on the similarity indices.

18 Claims, 14 Drawing Sheets

| PERSON / CANDIDATE | $W_n$ | $X_n$ | $Y_n$ | $Z_n$ |
|---|---|---|---|---|
| $A_{n-1}$ | 0.35 | 0.20 | 0.55 | 0.80 |
| $B_{n-1}$ | 0.77 | 0.11 | 0.37 | 0.14 |
| $C_{n-1}$ | 0.74 | 0.17 | 0.28 | 0.22 |

F I G. 10

| PERSON / CANDIDATE | Wn | Xn | Yn | Zn |
|---|---|---|---|---|
| An-1 | 0.35 | 0.20 | 0.55 | 0.80 |
| Bn-1 | 0.77 | 0.11 | 0.37 | 0.14 |
| Cn-1 | 0.74 | 0.17 | 0.28 | 0.22 |

Bn-1=Xn

F I G. 11

| PERSON\CANDIDATE | Wn | Xn | Yn | Zn |
|---|---|---|---|---|
| $A_{n-1}$ | 0.35 | 0.20 | 0.55 | 0.80 |
| $B_{n-1}$ | 0.77 | 0.11 | 0.37 | 0.14 |
| $C_{n-1}$ | 0.74 | 0.17 | 0.28 | 0.22 |

$C_{n-1} = Z_n$

F I G. 12

| PERSON\CANDIDATE | $W_n$ | $X_n$ | $Y_n$ | $Z_n$ |
|---|---|---|---|---|
| $A_{n-1}$ | 0.35 | 0.20 | 0.55 | 0.80 |
| ~~$B_{n-1}$~~ | ~~0.77~~ | ~~0.11~~ | ~~0.37~~ | ~~0.14~~ |
| ~~$C_{n-1}$~~ | ~~0.74~~ | ~~0.17~~ | ~~0.28~~ | ~~0.22~~ |

$A_{n-1} = W_n$

F I G. 13

| PERSON\CANDIDATE | $W_n$ | $X_n$ | $Y_n$ | $Z_n$ |
|---|---|---|---|---|
| $A_{n-1}$ | 0.35 | 0.20 | 0.55 | 0.80 |
| $B_{n-1}$ | 0.77 | 0.11 | 0.37 | 0.14 |
| $C_{n-1}$ | 0.74 | 0.17 | 0.28 | 0.22 |

$Y_n$: NEW PERSON

F I G. 14

HUMAN TRACKING APPARATUS, HUMAN TRACKING METHOD, AND HUMAN TRACKING PROCESSING PROGRAM

BACKGROUND OF THE INVENTION

The present invention relates to a human tracking apparatus, a human tracking method, and a human tracking processing program that track the movement of persons photographed in moving images.

DESCRIPTION OF RELATED ART

A "human tracking" process for detecting the general public photographed in moving images and for tracking the movement of persons is used for an application of measuring the number of persons entering and exiting a facility, for example.

A technique related to the human tracking process includes "METHOD AND DEVICE FOR TRACKING MOVING OBJECT BASED ON MOVING IMAGE DATA" disclosed in Japanese Patent Laid Open Publication No. 2004-46647.

The invention disclosed in Japanese Patent Laid Open Publication No. 2004-46647 calculates a predicted location based on the tracking object locations in past frames, extracts a candidate object from image data in the present frame, and allocates a candidate object closer to the predicted location as a tracking object.

This human tracking process tracks a person by determining the similarity between the person photographed in an arbitrary frame image and the person photographed in a previous frame and detecting a change in the location of the person determined to be the same.

However, only one parameter is used for the human tracking in the invention disclosed in Japanese Patent Laid Open Publication No. 2004-46647. Therefore, the accuracy for determining the similarity of the person is low. As a result, there was a problem that the accuracy of the human tracking was also reduced.

A technique using a plurality of parameters for the human tracking is disclosed in U.S. Patent No. 2005/0104959A1. The invention disclosed in U.S. Patent No. 2005/0104959A1 tracks a person based on the likelihood calculated based on the connection, speed, and likelihood of images.

However, the invention disclosed in U.S. Patent No. 2005/0104959A1 equally treats the parameters, such as the connectedness, speed, and similarity of images, whose meanings are totally different (see [0128]). Therefore, the likelihood calculated based on these parameters is not highly reliable. As a result, the accuracy of the result of the human tracking based on these parameters is also reduced.

The present invention has been made in view of the problems, and an exemplary object of the present invention is to provide a human tracking apparatus and method capable of highly accurately tracking the movement of persons photographed in moving images.

SUMMARY

To achieve the above exemplary object, a first exemplary aspect of the present invention provides a human tracking apparatus including: means for storing an inputted frame image; means for detecting persons photographed in the inputted frame image; means for registering already detected persons as candidates; means for calculating indices indicating the similarity between the persons detected in the inputted frame image and the candidates registered at the time of the frame for two or more types of parameters based on the stored frame images in relation to all combinations of the persons and the candidates; means for normalizing the calculated indices indicating the similarity; means for integrating the normalized indices indicating the similarity for each combination of the persons detected in the inputted frame image and the candidates; and tracking means for identifying a person the same as an arbitrary candidate based on the integrated indices indicating the similarity.

To achieve the above exemplary object, a second exemplary aspect of the present invention provides a human tracking method including: a step of detecting persons photographed in an inputted frame image; a step of calculating indices indicating the similarity between the persons detected in the inputted frame image and already detected persons registered as candidates at the time of the frame for two or more types of parameters based on stored frame images in relation to all combinations of the persons and the candidates; a step of normalizing the calculated indices indicating the similarity; a step of integrating the normalized indices indicating the similarity for each combination of the persons detected in the inputted frame image and the candidates; and a step of identifying a person the same as an arbitrary candidate based on the integrated indices indicating the similarity.

To achieve the above exemplary object, a third exemplary aspect of the present invention provides a human tracking processing program causing a computer to execute the human tracking method according to the second exemplary aspect of the present invention.

According to the present invention, a human tracking apparatus and method capable of highly accurately tracking the movement of persons photographed in moving images can be provided.

BRIEF DESCRIPTION OF THE DRAWINGS

The exemplary objects and features of the present invention will become more apparent from the consideration of the following detailed description taken in conjunction with the accompanying drawings, in which.

DESCRIPTION OF THE EXEMPLARY EMBODIMENTS

First Exemplary Embodiment

A first exemplary embodiment suitably implementing the present invention will be described.

Figure 1:
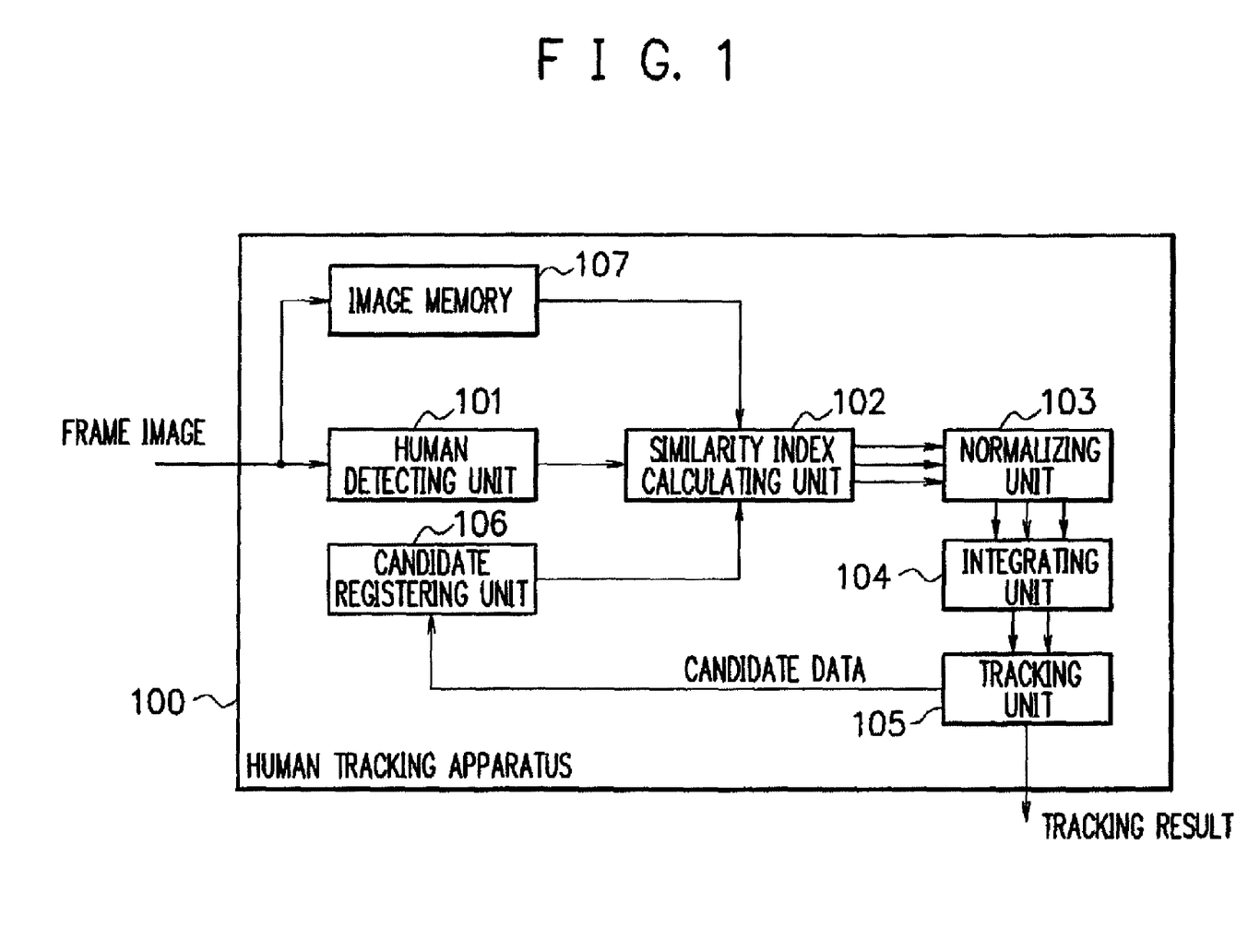
FIG. 1 is a configuration of a human tracking apparatus according to a first exemplary embodiment suitably implementing the present invention.

FIG. 1 is a configuration of a human tracking apparatus according to the first exemplary embodiment suitably implementing the present invention. A human tracking apparatus 100 includes a human detecting unit 101, a similarity index calculating unit 102, a normalizing unit 103, an integrating unit 104, a tracking unit 105, and a candidate registering unit 106.

The human detecting unit 101 analyzes an inputted frame image to detect a person photographed in the image. An arbitrary known method can be applied as a process for detecting a person. The similarity index calculating unit 102 quantifies, for a plurality of parameters, the similarity between a person photographed in the input frame image and persons who are photographed in previous frame images and who are registered in the candidate registering unit 106 to thereby calculate indices (similarity indices). The normalizing unit 103 converts the similarity indices with different meanings calculated by the similarity index calculating unit 102 to make the indices with the same meaning. The integrating unit 104 calculates a value, combining the normalized similarity indices. The tracking unit 105 determines, based on the integrated similarity indices, with which of the persons detected in the previous frames the person detected in the inputted frame image matches. The tracking unit 105 also records, in the candidate registering unit 106, the person detected in the inputted frame as a candidate in the frames to be inputted subsequently. The candidate registering unit 106 records information related to a candidate who may be the same person as the person photographed in the inputted frame image. The human detecting unit 101, the similarity index calculating unit 102, the normalizing unit 103, the integrating unit 104, and the tracking unit 105 can be realized on a computer-controlled apparatus by software processing.

The human detecting unit 101 uses a process for detecting the human head as a method for detecting a person from an input frame image of moving images. A face detecting method which is previously known can be applied as a process for detecting the head. If the tracking unit 105 determines that the detected person is not the same as the previously detected persons (candidates), the detected person is provided with a unique ID and registered to the candidate registering unit 106 and becomes a candidate for the same person in subsequent frames.

The human tracking apparatus according to the present invention quantifies the similarity of person with a plurality of different methods to make indices, normalizes and integrates the indices, and tracks a person based on the integrated indices.

An example of tracking the center position of the head of a person will be described below.

Figure 2:
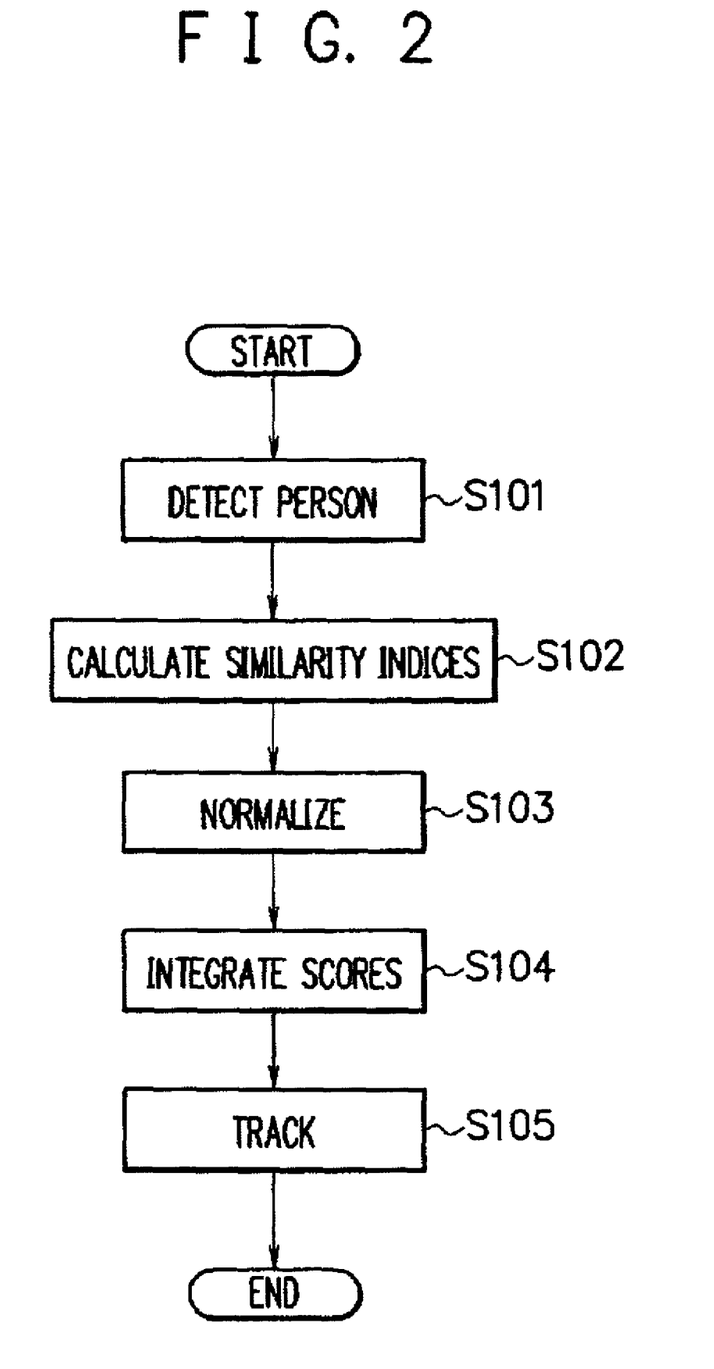
FIG. 2 is a flow of an operation of the human tracking apparatus according to the first exemplary embodiment.

FIG. 2 is a flow of an operation of the human tracking apparatus 100.

When a frame image is inputted, the human detecting unit 101 detects a person photographed in the frame image (step S101).

The similarity index calculating unit 102 calculates, for a plurality of parameters, indices indicating the similarity of person (similarity indices) in all combinations of the person detected by the human detecting unit 101 and the candidates registered in the candidate registering unit 106 (step S102).

The previous frame images required for the calculation of the similarity indices are acquired from an image memory 107.

The parameters for determining the similarity of person may include the following. However, the parameters are not limited thereto.

<Movement Distance>

Figure 3:
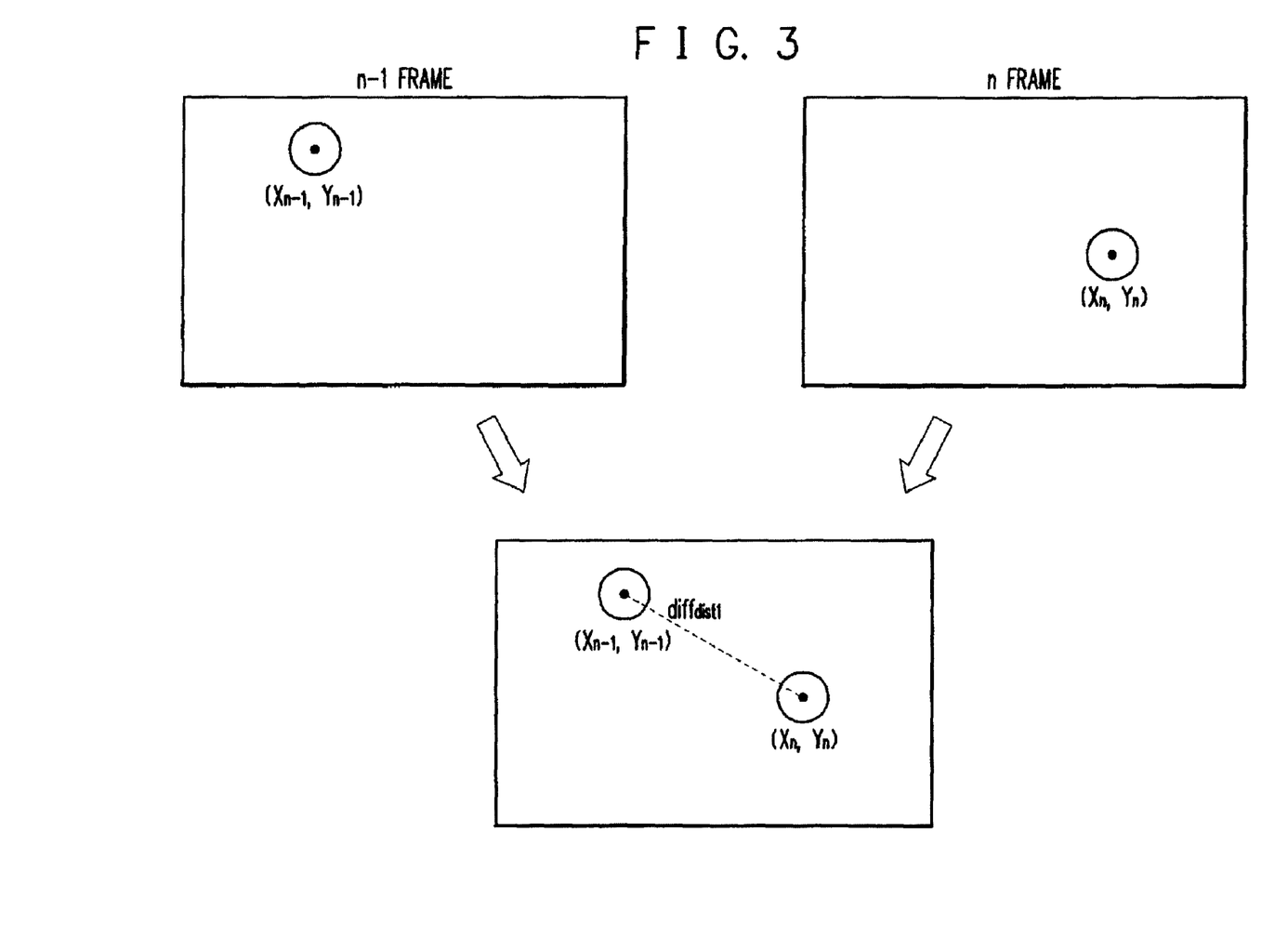
FIG. 3 is an example of a movement distance of a person between frames.

Usually, the location of the same person does not significantly change between consecutive frames. For example, as shown in FIG. 3, assuming that the location of an arbitrary candidate in n−1 frame is $(x_{n-1}, y_{n-1})$, and assuming that the location of a person in n frame is $(x_n, y_n)$, the smaller the distance between the two points $$\text{diff}_{dist1} = \{(x_{n-1}-x_n)^2 + (y_{n-1}-y_n)^2\}^{1/2},$$

the higher the similarity of person.

<Comparison with Predicted Location>

Figure 4:
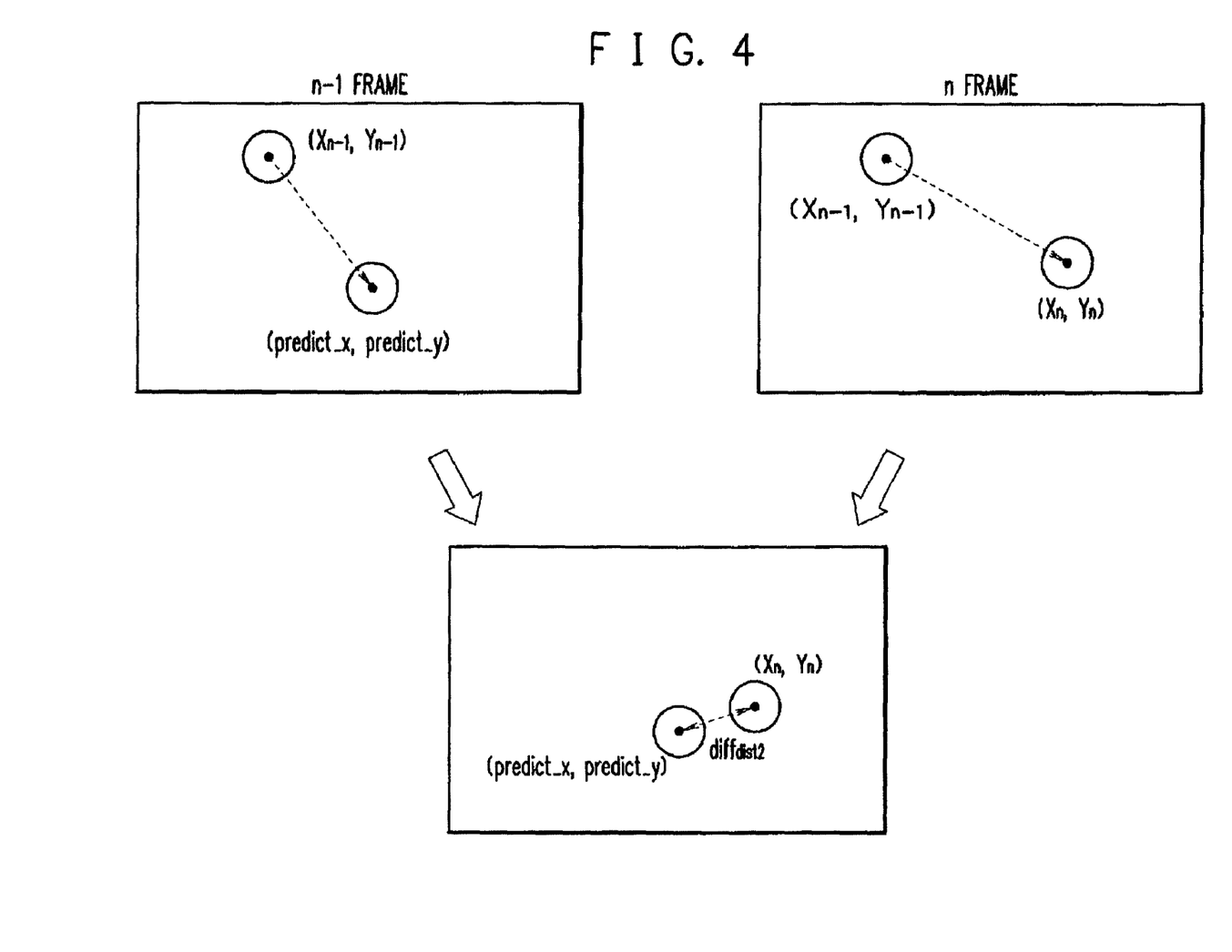
FIG. 4 is an example of a difference between a predicted location of a person and the actual location.

To which location a person photographed in an image of a certain frame moves in an image of the next frame is predictable. For example, to which location a person photographed in the image of n−1 frame moves in the next n frame can be predicted based on the image of n−1 frame and the images up to n−2 frame. As shown in FIG. 4, assuming that the location of the person in n frame image predicted in n−1 frame is (predict_x, predict_y), and assuming that the actual location in n frame is $(x_n, y_n)$, the smaller the distance between the two points $$\text{diff}_{dist2} = \{(\text{predict\_}x - x_n)^2 + (\text{predict\_}y - y_n)^2\}^{1/2},$$

the higher the similarity of person.

<Size of Head>

Figure 5:
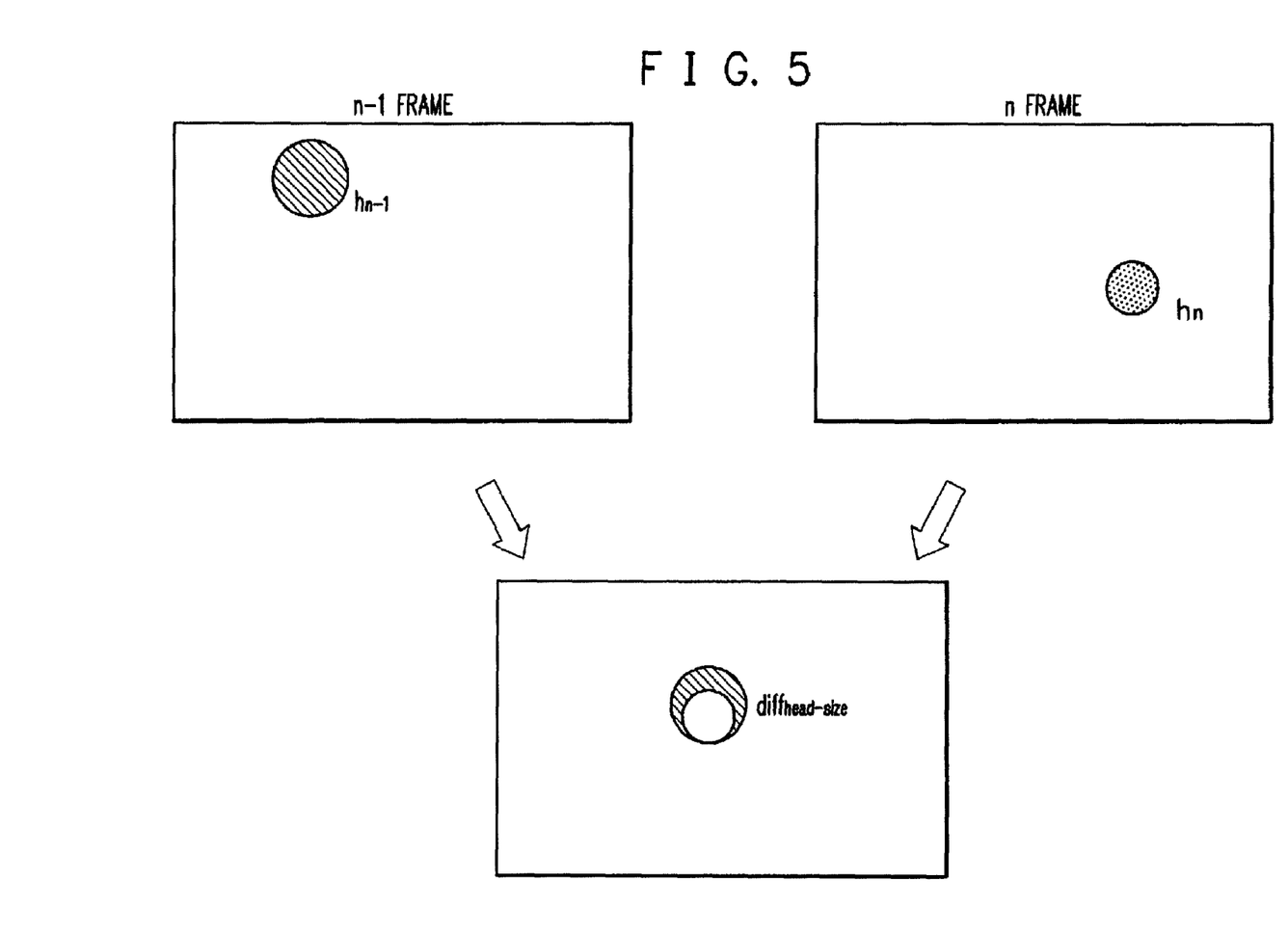
FIG. 5 is an example of a difference in the size of the head of a person between frames.

Usually, the size of the head of the same person does not significantly change between consecutive frames. Therefore, as shown in FIG. 5, assuming that the size of the head of an arbitrary person in n−1 frame is $h_{(n-1)}$, and assuming the size of the head in n frame is $h_n$, the smaller the difference in the size of the head $$\text{diff}_{head-size} = \{\max(h_{n-1}, h_n) - \min(h_{n-1}, h_n)\}/\max(h_{n-1}, h_n),$$

the higher the similarity of person.

<Similarity of Clothing>

Figure 6:
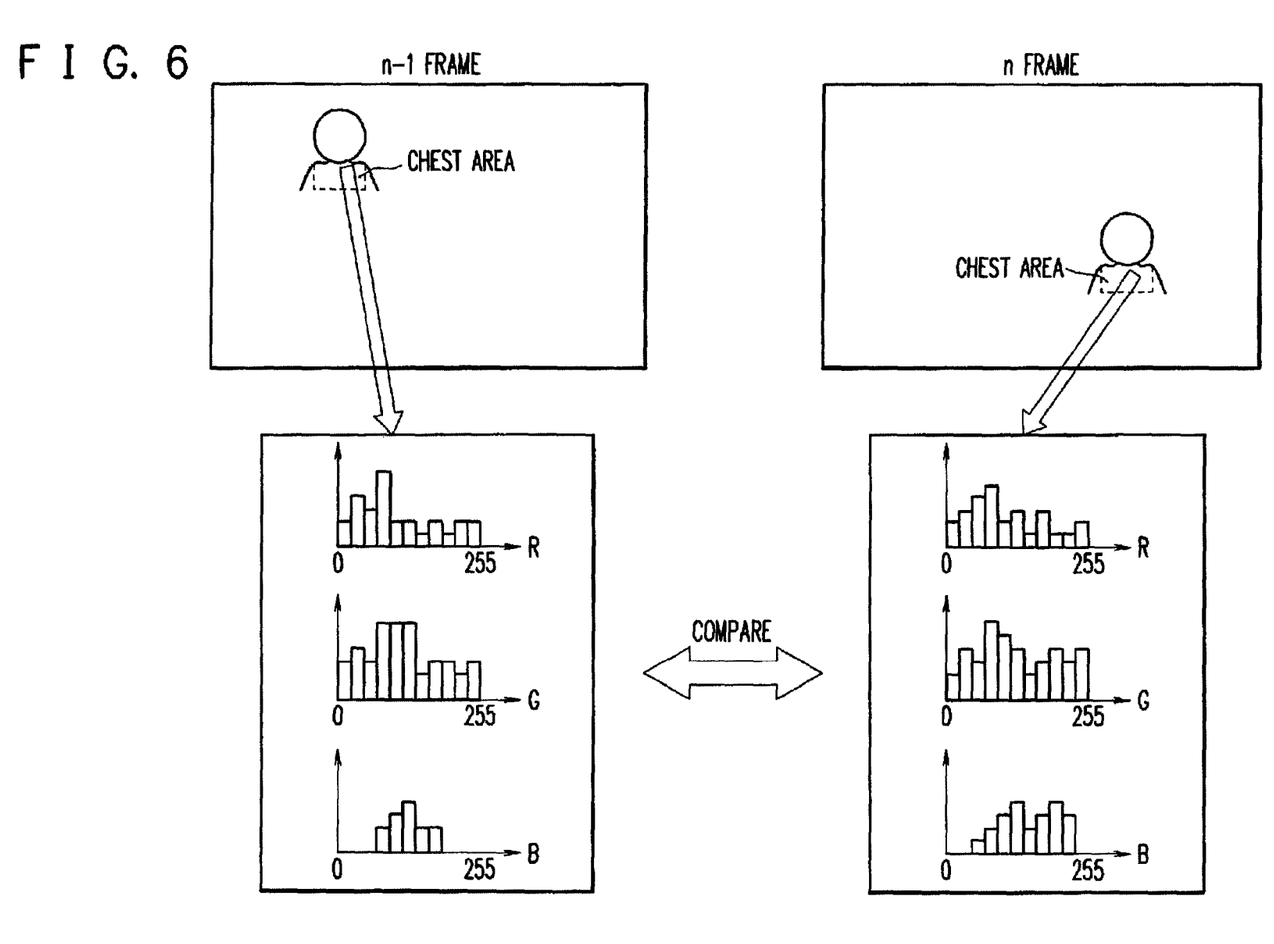
FIG. 6 is an example of a histogram distribution of color components in the chest area.

Clothing of the same person does not significantly change between consecutive frames. Therefore, the similarity of person can be determined based on the clothing of persons photographed in frame images. As shown in FIG. 6, when the head of a person is detected in a frame image, it can be estimated that the part directly below the head is the chest of the person. Therefore, the histogram distribution of color components of the part directly below the head (chest area) of the person in a certain frame image is substantially the same as the histogram distribution of color components in the chest area of the same person in the image of the subsequent frame.

The difference between the histogram distribution of color components in the chest area of n frame and the histogram distribution of color components in the chest area of n−1 frame can be quantified as, for example, an amount of Kullback-Leibler (KL) information (Kullback-Leibler divergence). Thus, assuming that the histogram distribution of color components in n−1 frame is $\text{Hist}_{n-1}$, and assuming that the histogram distribution of color components in n frame is $\text{Hist}_n$, the smaller the difference of histogram distributions of color components $$\text{diff}_{color1} = KL(\text{Hist}_{n-1}, \text{Hist}_n),$$

the higher the similarity of person.

However, the histogram distribution of color components in the chest area of a specific frame may be different from that in other frames, such as when another person passes in front of a certain person. Therefore, the similarity of person is also determined by comparing the histogram distribution of color components in the chest area of n frame and the average of the histogram distributions of color components in the chest area of the frames up to n−1. In this case, the difference is also quantified as an amount of KL information as described above.

Assuming that the average of the histogram distributions of color components of the frames up to n−1 is $Hist_{avg}$, and assuming that the histogram distribution of color components of n frame is $Hist_n$, the smaller $$diff_{color2} = KL(Hist_{avg}, Hist_n),$$

the higher the similarity of person.

An example of this process is described in 3.1 Color Rectangle Features of Changjiang Yang, Ramani Duraiswami and Larry Davis, Fast Multiple Object Tracking via a Hierarchical Particle Filter, "Proceedings of the Tenth IEEE International Conference on Computer Vision", 2005.

<Orientation of Head>

Figure 7:
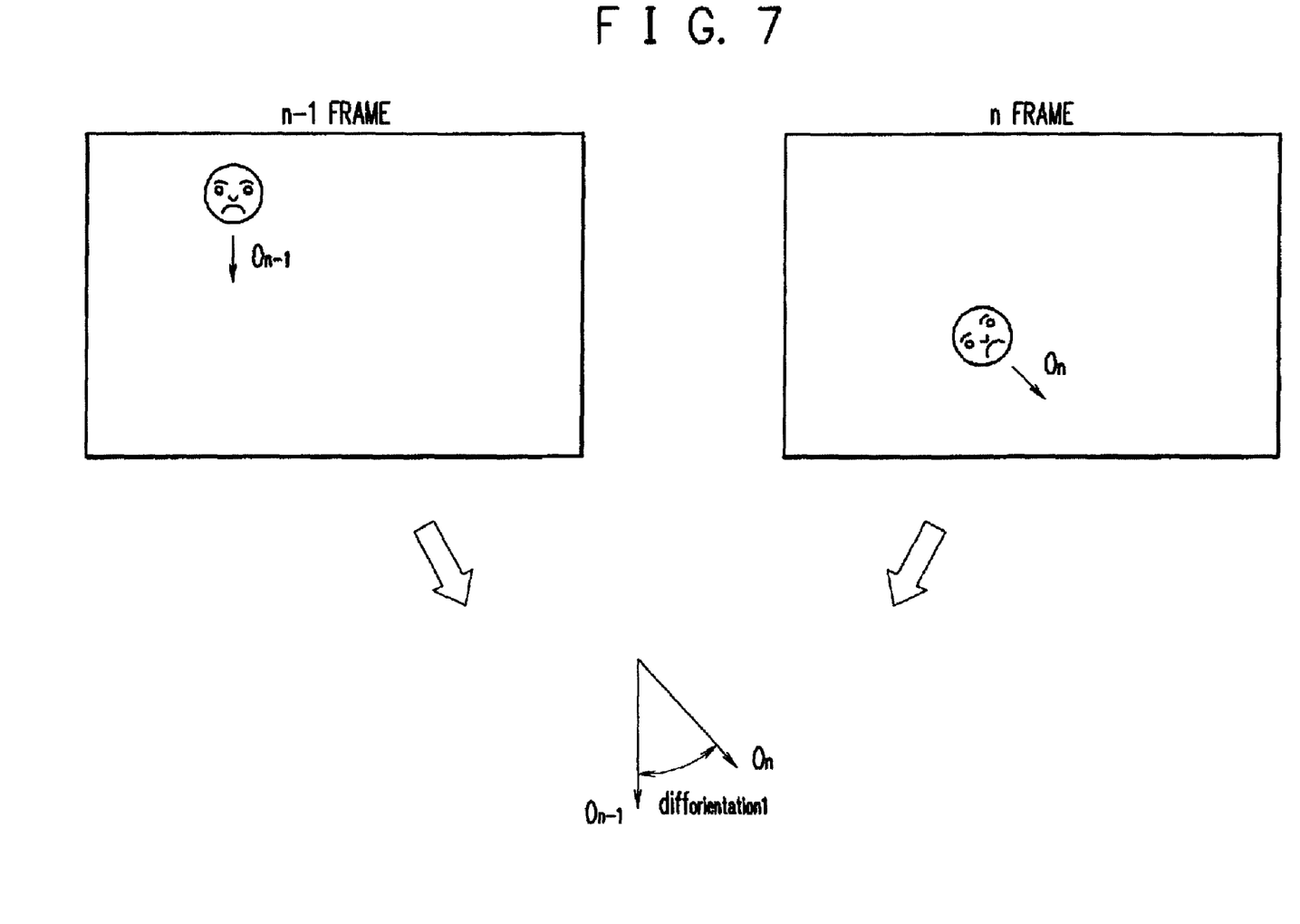
FIG. 7 is an example of a difference in the orientation of the head between frames.

A human usually moves facing a certain direction. Therefore, it is rare that the orientation of the head in a certain frame is extremely different from the orientation of the head in the next frame. As a result, the similarity of person can be determined by comparing the orientation of the head in n−1 frame and the orientation of the head in n frame. As shown in FIG. 7, assuming that the orientation of the head in n−1 frame is $O_{n-1}$, and assuming that the orientation of the head in n frame is $O_n$, the smaller $$differ_{orientation1} = |O_{n-1} - O_n|,$$

the higher the similarity of person.

It can be considered that the direction of the head during the movement matches the direction of travel of the person. Therefore, the similarity of person can be determined by comparing the moving direction predicted from the orientation of the head in n−1 frame and the orientation moved from n−1 frame to n frame.

Figure 8:
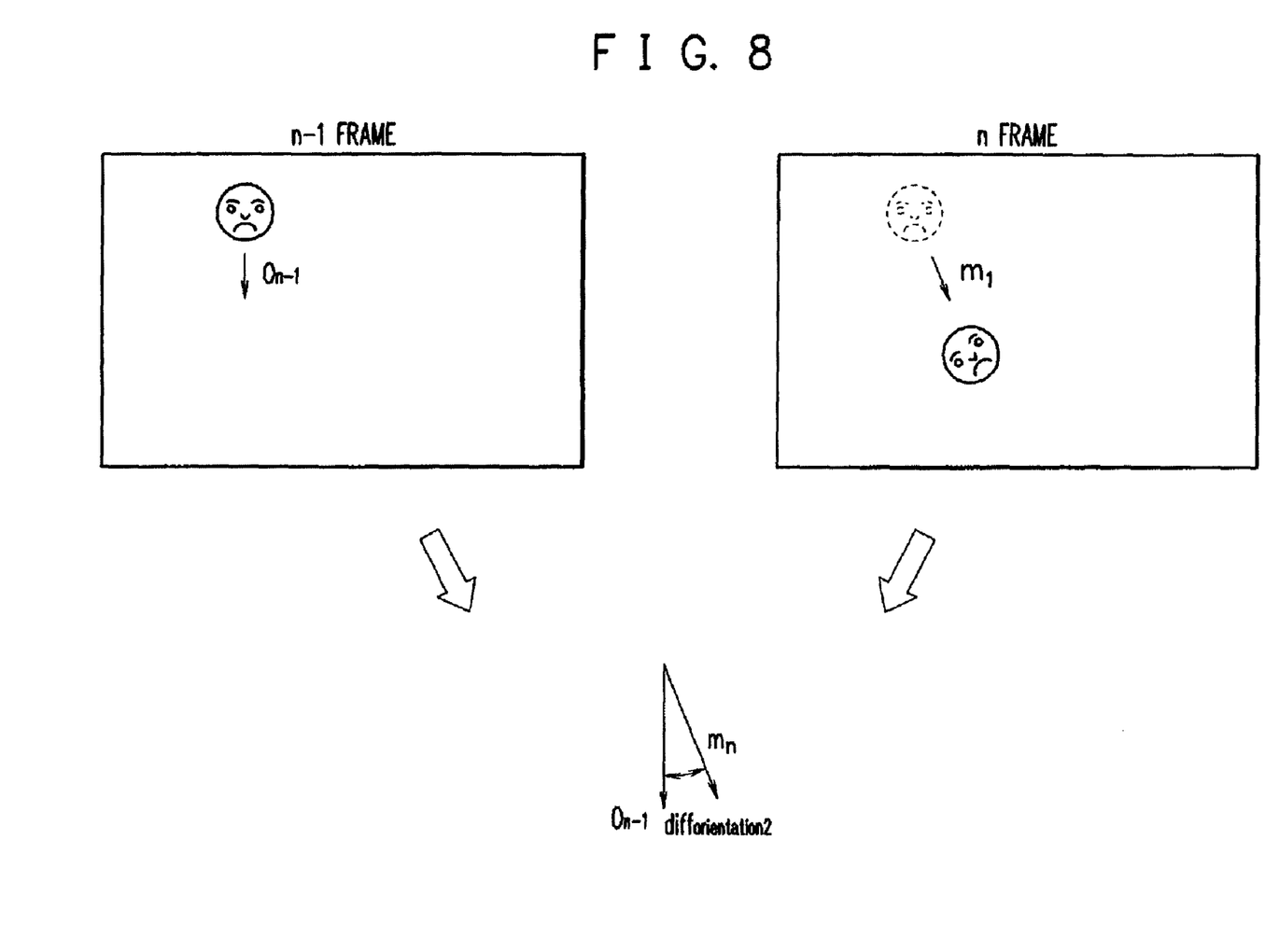
FIG. 8 is an example of a difference between a predicted moving direction of a person and the actual moving direction.

As shown in FIG. 8, assuming that the orientation of the head in n−1 frame is $O_{n-1}$, and assuming that the orientation moved from n−1 frame to n frame is $m_n$, the smaller $$diff_{orientation2} = |O_{n-1} - m_n|,$$

the higher the similarity of person.

<Similarity of Face>

The face of the same person does not significantly change between consecutive frames. Therefore, the similarity of person can be determined based on the face of a person photographed in a frame image.

The difference in the face of person between frames can be quantified by template matching (Sum of Squared Difference: SSD, Sum of Absolute Difference: SAD) or Euclidean distance on the Principal Component Analysis (PCA) space.

Assuming that the value quantified with these methods is $diff_{face}$, the smaller the value, the higher the similarity of person.

<Degree of Gender>

Femininity (masculinity) of the face of the same person does not significantly change between consecutive frames. Therefore, the similarity of person can be determined based on the femininity (masculinity) of the person photographed in a frame image.

Defining the femininity (masculinity) as a degree of gender, the degree of gender can be outputted by a recognition device (identification device) based on a face image. For example, a value closer to 0 can be outputted if the face of the person photographed in the frame image is more feminine. A value closer to 1 can be outputted if the face is more masculine.

In outputting the degree of gender as described above, assuming that the degree of gender in n−1 frame is $g_{n-1}$, and assuming that the degree of gender in n frame is $g_n$, the smaller $$diff_{gender} = |g_{n-1} - g_n|,$$

the higher the similarity of person.

<Age>

Age of the same person does not significantly change between consecutive frames. Therefore, the similarity of person can be determined based on the age of a person photographed in a frame image.

The age of person can be estimated by an identification device that treats continuous quantity (in other words, treats the regression problem) based on a face image.

Assuming that the age estimated in n−1 frame is $g_{n-1}$, and assuming that the age estimated in n frame is $g_n$, the smaller $$diff_{age} = |age_{n-1} - age_n|,$$

the higher the similarity of person.

Whether to use the parameters for the human tracking can be set individually.

Since the meanings of the similarity indices used for determining the similarity of person are different respectively, the similarity of person cannot be evaluated by comparing the different similarity indices. Therefore, the normalizing unit 103 divides the values of the similarity indices by predetermined thresholds specific to the similarity indices to thereby normalize the similarity indices (step S103). The predetermined thresholds are maximum values for determining the same person. For example, in case of the movement distance, if a determination of the same person is not made when the movement distance between frames exceeds L, the normalization is performed by dividing the actual movement distance X by L. Hereinafter, the normalized value will be referred to as score. The score is a value indicating the possibility of the same person with a range between 0 to 1, and the closer the value to 0, the higher the possibility of the same person. This is common to all original similarity indices.

The integrating unit 104 arithmetically averages the scores in relation to a combination of a certain person and a certain candidate to calculate a value in which the determination results of similarity based on the similarity indices are integrated in relation to the combination of the person and the candidate (step S104).

A weighted and averaged value can be calculated by changing the weight for each similarity index. For example, in case of integrating four scores A to D, if the scores are integrated as 0.25A+0.25B+0.25C+0.25D, the weights of the similarity indices are the same. Meanwhile, if the scores are integrated as 0.4A+0.2B+0.2C+0.2D, twice as much weight as for the other similarity indices can be applied to the similarity index of the score A.

Figure 9:
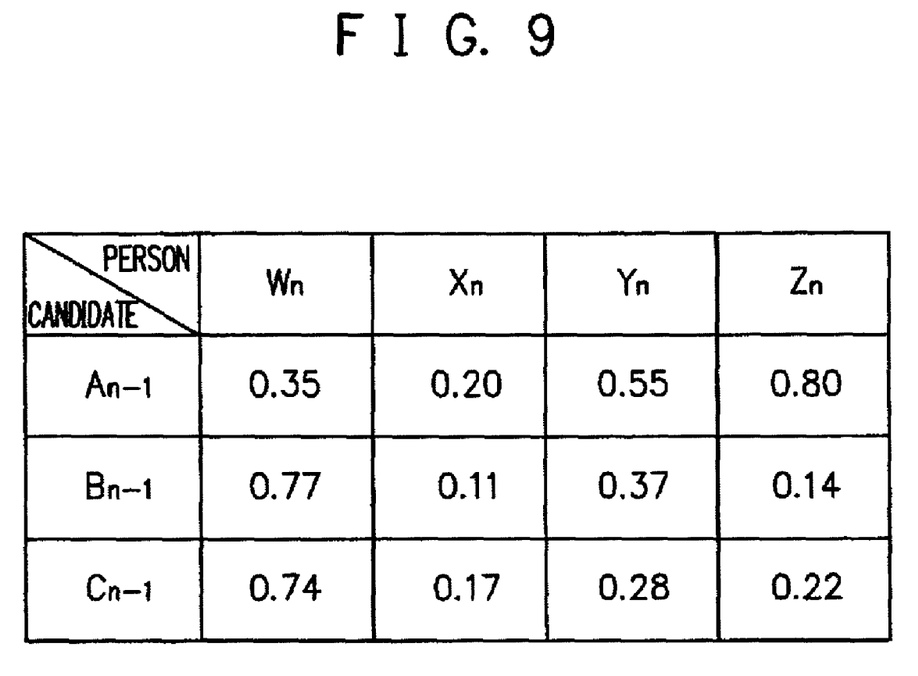
FIG. 9 is an example of a tracking process.

The scores calculated in this way are calculated for all persons detected in n frame and all candidates that may be determined as the same person. For example, as shown in FIG. 9, four persons (W, X, Y, and Z) are detected in n frame, and if three persons (A, B, and C) are registered as candidates of the same person at that point, 4×3=12 scores are calculated. $W_n$, $X_n$, $Y_n$, and $Z_n$ denote that the persons W, X, Y, and Z are detected in n frame, while $A_{n-1}$, $B_{n-1}$, and $C_{n-1}$ denote that the candidates A, B, and C are detected in n−1 frame.

The tracking unit 105 associates the persons and the candidates with the following procedure based on the integrated scores (step S105).

Figure 10:
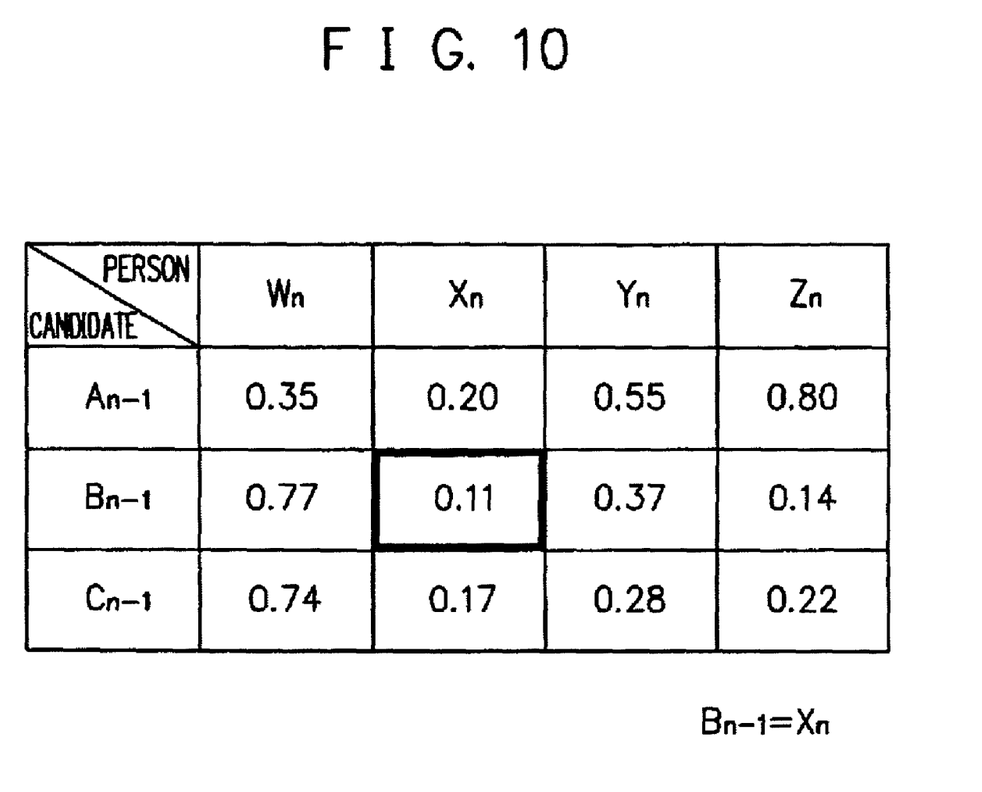
FIG. 10 is an example of the tracking process.

The tracking unit 105 first detects the minimum value among the scores integrated by the integrating unit 104 and makes a determination of the same person. In this case, the score in a combination of $B_{n-1}$ and $X_n$ is the smallest value. Therefore, as shown in FIG. 10, the tracking unit 105 determines that X detected in n frame is the candidate B.

Figure 11:
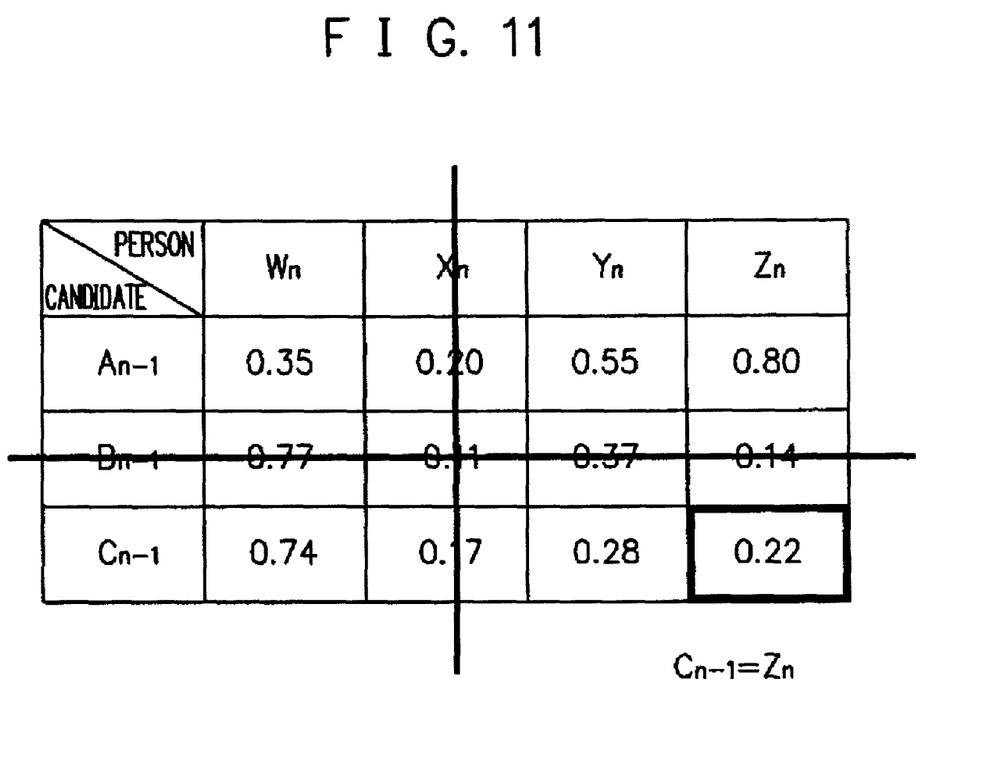
FIG. 11 is an example of the tracking process.

The tracking unit 105 then detects the smallest value among the scores not related to the person B and the person X and makes a determination of the same person. In this case, the score in a combination of $C_{n-1}$ and $Z_n$ is the smallest value. Therefore, as shown in FIG. 11, the tracking unit 105 determines that Z detected in n frame is the candidate C.

Figure 12:
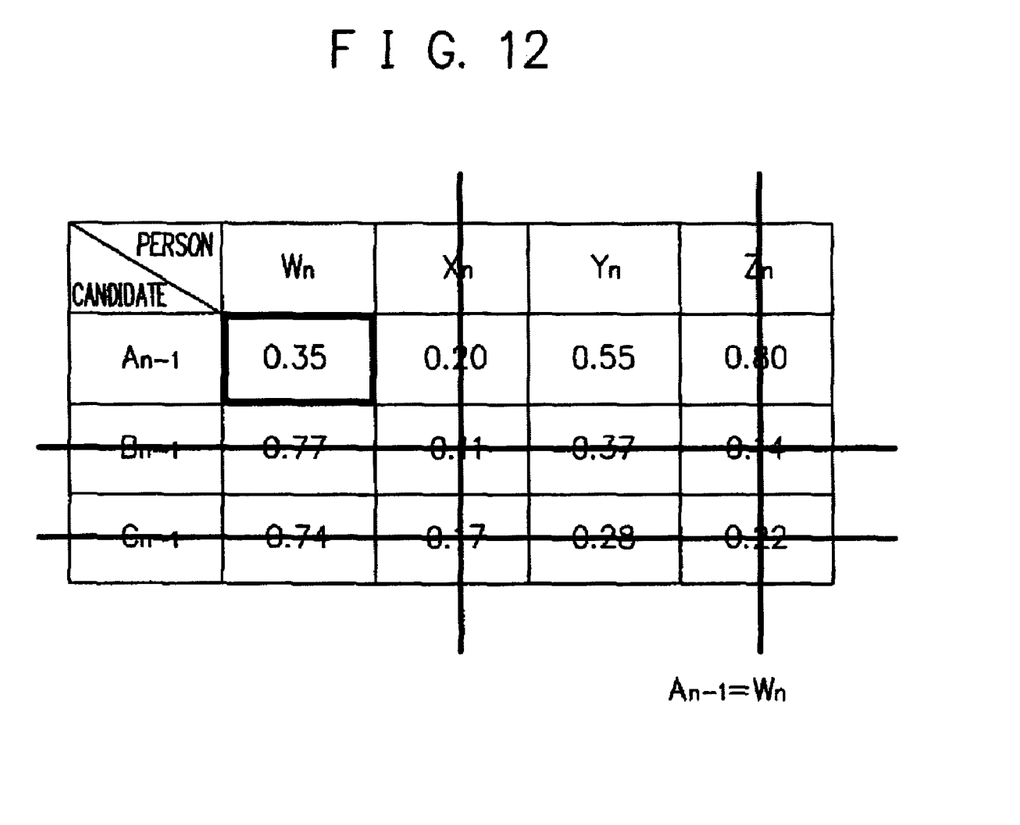
FIG. 12 is an example of the tracking process.

Subsequently, the tracking unit 105 detects the smallest value among the scores not related to the persons B, C, X and Z and makes a determination of the same person. In this case, the score in a combination of $A_{n-1}$ and $W_n$ is the smallest value. Therefore, as shown in FIG. 12, the tracking unit 105 determines that W detected in n frame is the candidate A.

Figure 13:
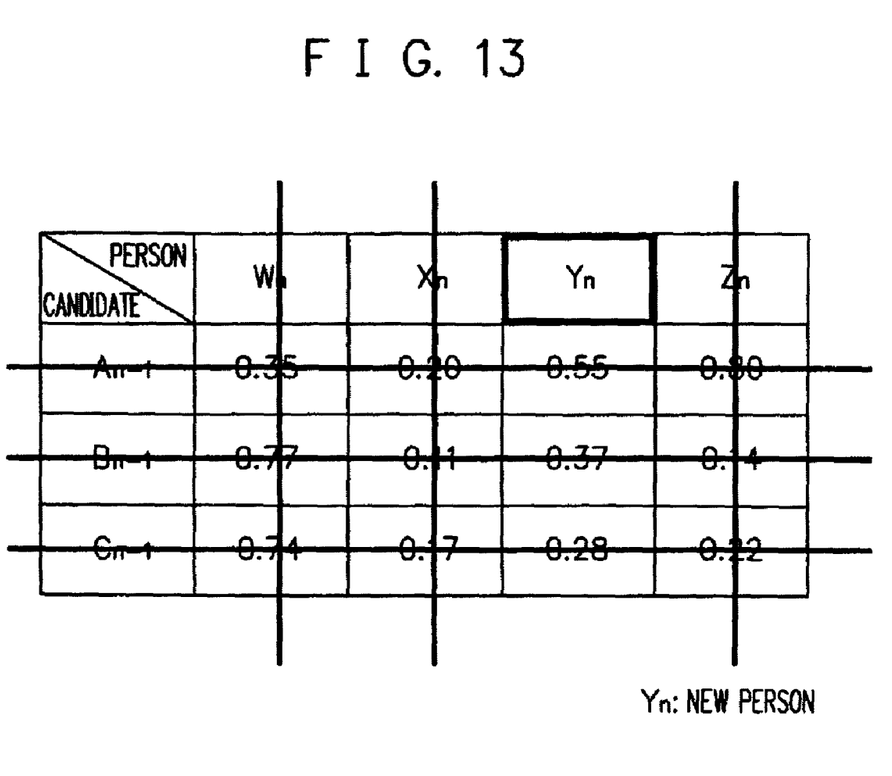
FIG. 13 is an example of the tracking process.

The persons the same as the registered candidates are all detected at this point. Therefore, as shown in FIG. 13, the tracking unit 105 determines that the remaining person Y is a new person. The tracking unit 105 registers, to the candidate registering unit 106, the person Y as a candidate in the subsequent tracking processes. The human detecting unit 101 may erroneously detect something that is not a person as a person. Therefore, it is preferable that the tracking unit 105 registers, to the candidate registering unit 106, only a person who has remained for a predetermined consecutive number of times as a new person.

If there is a candidate who cannot be tracked in spite of being registered in the candidate registering unit 106 (for example, when the number of persons detected by the human detecting unit 101 from the input frame image is less than the number of candidates registered in the candidate registering unit 106), the tracking unit 105 determines that the candidate who cannot be tracked is framed out. It is preferable that the tracking unit 105 determines that the candidate who cannot be tracked for a predetermined consecutive number of times is framed out, because the human detecting unit 101 may fail to detect a person even though the person is in the frame such as when another person passes in front of a certain person.

The human tracking apparatus 100 repeats the above process for each predetermined number of frames to track a person photographed in moving images.

In the example herein, the candidates of the same person are all detected in n–1 frame. However, if there is a candidate not detected in n–1 frame, the similarity index calculating unit 102 acquires an image of a previously detected frame (such as n–2 frame) from the image memory 107 as for the candidate and calculates the similarity indices based on the differences with the input frame image.

In this way, the human tracking apparatus according to the exemplary embodiment calculates similarity indices in relation to a plurality of parameters and normalizes and integrates the similarity indices, thereby enabling to highly accurately track the movement of persons photographed in moving images.

Second Exemplary Embodiment

Figure 14:
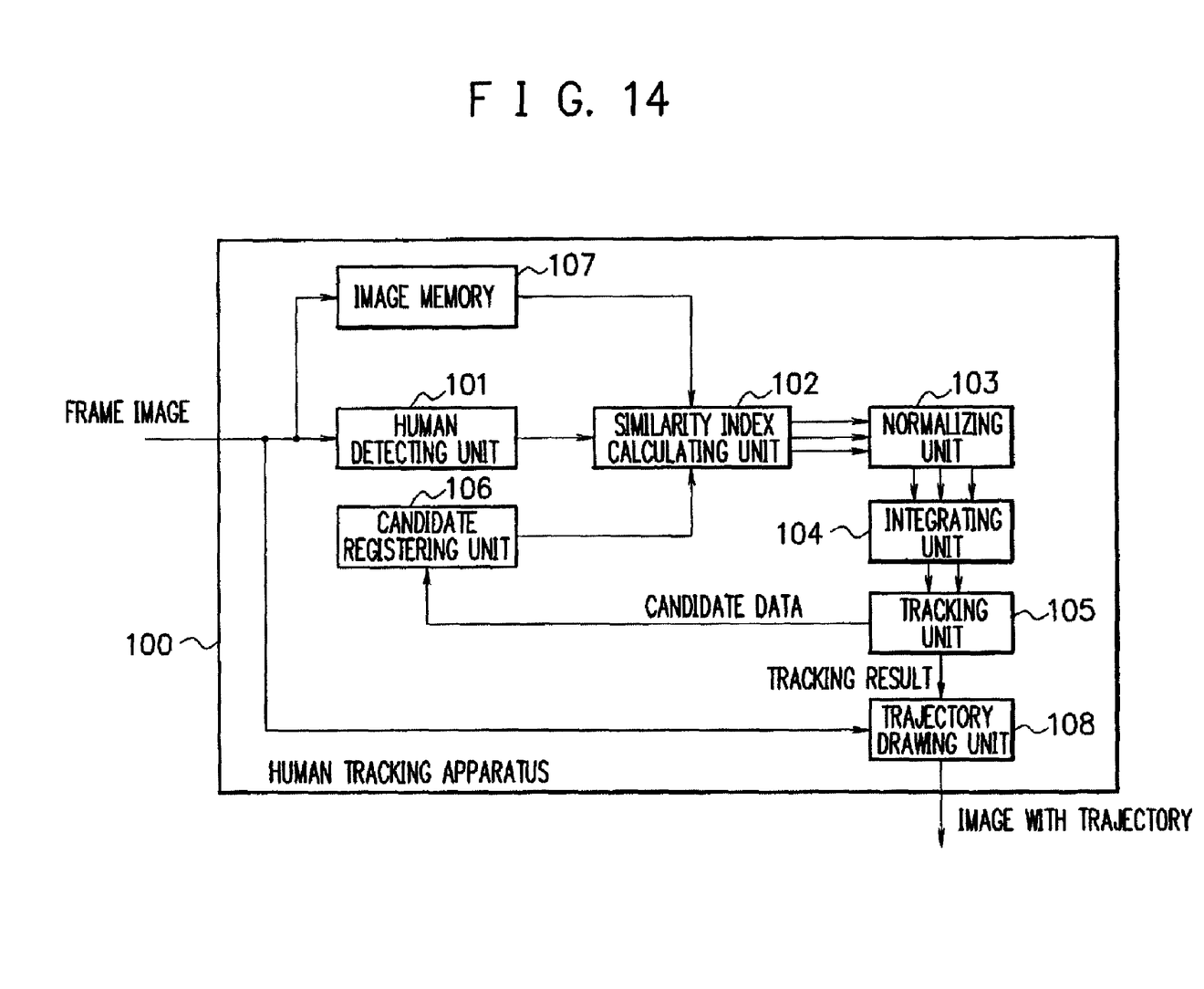
FIG. 14 is a configuration of a human tracking apparatus according to a second exemplary embodiment suitably implementing the present invention.

A second exemplary embodiment suitably implementing the present invention will be described. FIG. 14 is a configuration of a human tracking apparatus according to the second exemplary embodiment. The difference from the first exemplary embodiment is that the human tracking apparatus 100 comprises a trajectory drawing unit 108.

Data of frame images and results of human tracking by the tracking unit 105 are inputted to the trajectory drawing unit 108, which then draws a trajectory of movement of each person on the frame images based on the human tracking results. The trajectory drawing unit 108 can be realized on a computer-controlled apparatus by software processing.

The trajectory drawing unit 108 outputs an image with trajectory. As a result, an image provided with a trajectory can be displayed on a display device or the like not shown.

Since other points are the same as in the first exemplary embodiment, the description will not be repeated.

The exemplary embodiments are examples of suitable implementation of the present invention. The present invention is not limited to these, and various modifications can be made.

What is claimed is:

1. A human tracking apparatus comprising:
    a storing unit which stores an inputted frame image;
    a detecting unit which detects persons photographed in the inputted frame image;
    a registering unit which registers already detected persons, photographed in at least one previous inputted frame image, as candidates, wherein the at least one previous inputted frame image is associated with the inputted frame image;
    a calculating unit which calculates indices indicating the similarity between the persons detected in the inputted frame image and the candidates based on two or more parameters in relation to all combinations of the persons and the candidates;
    a normalizing unit which normalizes the calculated indices indicating the similarity;
    an integrating unit which integrates the normalized indices indicating the similarity for each combination of the persons detected in the inputted frame image and the candidates; and
    a tracking unit which identifies at least one of the persons being the same as at least one of the candidates based on the integrated indices indicating the similarity.

2. The human tracking apparatus according to claim 1, wherein
    the normalization is made, for each of the parameters, with values as thresholds, the values being equivalent to the maximum differences that enable to regard that the persons detected in the inputted frame image and the candidates are the same persons.

3. The human tracking apparatus according to claim 1, wherein
    one of the parameters is differences between the locations of the persons in the inputted frame image and the locations of the candidates in the frame image when the candidates are detected.

4. The human tracking apparatus according to claim 1, wherein
    one of the parameters is differences between the locations of the persons in the inputted frame image predicted based on the locations of the persons in past frame images and the locations where the persons are actually detected in the inputted frame image.

5. The human tracking apparatus according to claim 1, wherein
    one of the parameters is differences between the sizes of the persons in the inputted frame image and the sizes of the candidates in the frame image when the candidates are detected.

6. The human tracking apparatus according to claim 1, wherein
one of the parameters is differences between the distributions of colors in areas occupied by the persons in the inputted frame image and the distributions of colors in areas occupied by the candidates in the frame image in which the candidates are detected.

7. The human tracking apparatus according to claim 1, wherein
one of the parameters is differences between the distributions of colors in areas occupied by the persons in the inputted frame image and an average of the distributions of colors in areas occupied by the candidates in two or more frame images in which the candidates are detected.

8. The human tracking apparatus according to claim 1, wherein
one of the parameters is differences between the orientations of the persons in the inputted frame image and the orientations of the candidates in the frame image when the candidates are detected.

9. The human tracking apparatus according to claim 1, wherein
one of the parameters is differences between the moving directions of the persons in the inputted frame image predicted based on the orientations of the persons in past frame images and the moving directions of the persons actually detected in the inputted frame image.

10. The human tracking apparatus according to claim 1, wherein
one of the parameters is differences between the shapes of the person in the inputted frame image and the shapes of the candidates in the frame image when the candidates are detected.

11. The human tracking apparatus according to claim 1, wherein
whether to use the indices indicating the similarity with the candidates can be individually set for each parameter.

12. The human tracking apparatus according to claim 1, wherein
a person and a candidate in a combination of the person and the candidate with a value indicating the highest similarity among the integrated indices indicating the similarity are identified as the same person, and
persons and candidates in combinations of the persons and the candidates with values indicating the highest similarity among the remaining integrated indices indicating the similarity are sequentially identified as the same persons as for the combinations not including the persons and the candidates previously identified as the same persons.

13. The human tracking apparatus according to claim 1, further comprising
a drawing unit which draws, on the inputted frame image, a trajectory of a person detected in the frame image based on an identification result of the tracking unit.

14. A human tracking method comprising:
a step of detecting persons photographed in an inputted frame image;
a step of calculating indices indicating the similarity, based on two or more parameters, between the persons detected in the inputted frame image and already detected persons, photographed in at least one previous inputted frame image, registered as candidates in relation to all combinations of the persons and the candidates, wherein the at least one previous inputted frame image is associated with the inputted frame image;
a step of normalizing the calculated indices indicating the similarity;
a step of integrating the normalized indices indicating the similarity for each combination of the persons detected in the inputted frame image and the candidates; and
a step of identifying at least one of the persons being the same as at least one of the candidates based on the integrated indices indicating the similarity.

15. The human tracking method according to claim 14, wherein
the normalization is made, for each of the parameters, values as thresholds, the values being equivalent to the maximum differences that enable to regard that the persons detected in the inputted frame image and the candidates are the same persons.

16. The human tracking method according to claim 14, wherein
a person and a candidate in a combination of the person and the candidate with a value indicating the highest similarity among the integrated indices indicating the similarity are identified as the same person, and
persons and candidates in combinations of the persons and the candidates with values indicating the highest similarity among the remaining integrated indices indicating the similarity are sequentially identified as the same persons as for the combinations not including the persons and the candidates previously identified as the same persons.

17. A non-transitory computer-readable medium storing a computer program for implementing the human tracking method according to claim 14.

18. A human tracking apparatus comprising:
means for storing an inputted frame image;
means for detecting persons photographed in the inputted frame image;
means for registering already detected persons, photographed in at least one previous inputted frame image, as candidates, wherein the at least one previous inputted frame image is associated with the inputted frame image;
means for calculating indices indicating the similarity between the persons detected in the inputted frame image and the candidates based on two or more parameters in relation to all combinations of the persons and the candidates;
means for normalizing the calculated indices indicating the similarity;
means for integrating the normalized indices indicating the similarity for each combination of the persons detected in the inputted frame image and the candidates; and
tracking means for identifying at least one of the persons being the same as at least one of the candidates based on the integrated indices indicating the similarity.

* * * * *